Nov. 21, 1961   R. P. KINSEY   3,009,867
COOLING OF NUCLEAR REACTORS
Filed June 24, 1958

INVENTOR
RICHARD PHILLIP KINSEY
BY Larson and Taylor
ATTORNEYS

United States Patent Office 3,009,867
Patented Nov. 21, 1961

3,009,867
COOLING OF NUCLEAR REACTORS
Richard Phillip Kinsey, Bowden, England, assignor to United Kingdom Atomic Energy Authority, London, England
Filed June 24, 1958, Ser. No. 744,134
Claims priority, application Great Britain June 24, 1957
2 Claims. (Cl. 204—193.2)

The present invention relates to a nuclear reactor installation which comprises a reactor core supported in a core vessel surrounded by a radiation shield in a containment vessel. The invention is concerned with the removal of heat from the core vessel in the event of severe damage to the core.

According to the invention a nuclear reactor installation comprising a reactor core supported in a core vessel surrounded by a radiation shield in a containment vessel is characterised in having ducts in the radiation shield to allow convection flow of a heat transfer fluid in a circuit over the core vessel and over the walls of the containment vessel.

Figure 1:
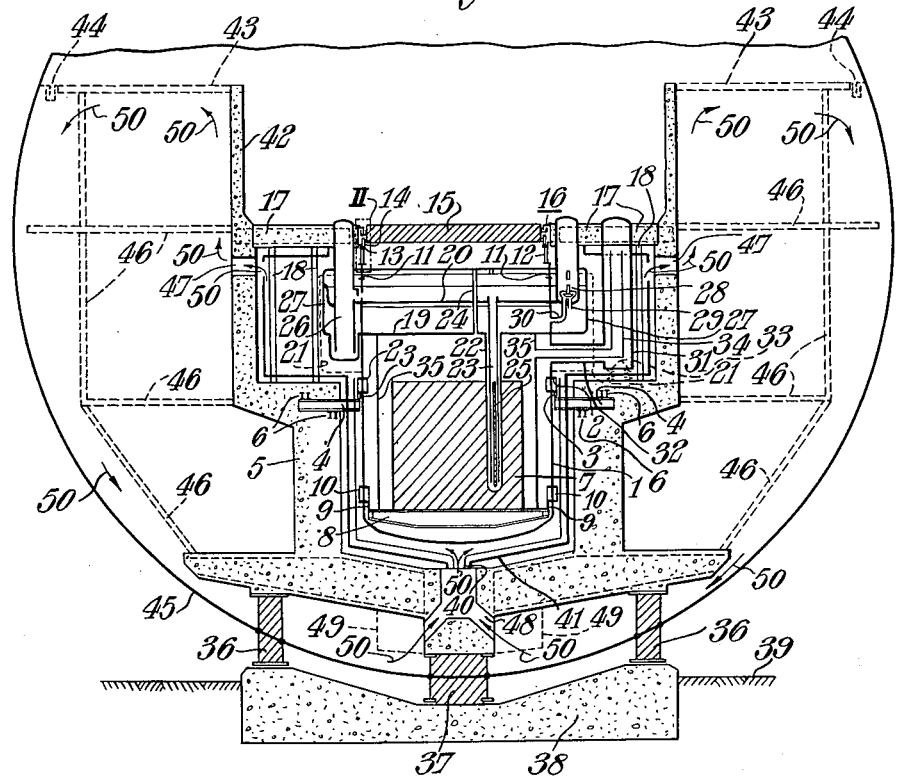
Figure 2:
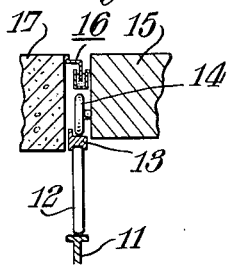

An embodiment of the invention will now be described with reference to the accompanying drawings in which FIG. 1 is a sectional elevation and FIG. 2 is an enlargement of the framed portion II of FIG. 1.

A mild-steel core vessel 1 is suspended from a flange 2 in the form of a ring torsion beam resting on a series of rollers 3 on a fixed support comprising cantilever beams 4 embedded in a biological shield 5 and strengthened by beams 6. A reactor core 7 comprising a graphite moderator structure rests on a grid 8 suspended by hangers 9 from a flange 10 also in the form of a ring torsion beam. The core vessel 1 at its top terminates in a flange 11 and carries a series of inverted A-shaped rocking supports 12 which carry a rail 13. A rotatable gamma shield 15 has a series of wheels 14 running on the rail 13 and a dip seal 16 having one part secured to the shield 15 and the other part fixed to a cap 17 which forms part of the biological shield 5 and is carried on columns 18. The core vessel 1 carries a mild-steel tank (for liquid sodium coolant) comprising a lower tank 19, an upper tank 20 and a leak jacket 21. A series of thimble tubes 22 (only one being shown for clarity) lead from the lower tank 19 to the reactor core 7 and a corresponding series of tubes 23 form channels to the upper tank 20, each tube 23 containing a fuel element 25. The fuel elements 25 are cooled by the liquid sodium coolant. Tubes 24 allow the passage of control rods through the sodium tanks 19 and 20 and each tube 24 acts as a stiffener for the tanks 19, 20.

The upper tank 20 communicates with a heat exchanger 26 (for the liquid sodium coolant) and, via the heat exchanger 26, with an annular chamber 27. The annular chamber 27 contains a centrifugal pump 28 having an inlet 29 from the chamber 27 and an outlet 30 connecting to the lower tank 19. The heat exchanger 26, chamber 27 and pump 28 are joined with the tank 19 and their weight is taken through the tank 19 into the core vessel 1, these units being free to move with temperature changes in the cap 17 of the biological shield 5.

The core vessel 1 carries a heat exchanger 31 (for gas used to cool the moderator structure) connected to the core vessel 1 by a pipe 32 and partially supported by springs 33 to allow for differential thermal expansion over the distance between the flange 2 and the pipe 32. The heat exchanger 31 has an inner duct 34 connected to a chamber 35.

The biological shield 5 rests on a skirt 36 and central pillar 37 standing on a raft 38 embedded in the ground 39. A thermal shield 40 (which together with the biological shield 5 forms a radiation shield) absorbs a large proportion of the high energy radiation of the reactor core 7 and the consequential heat generated in the shield 40 is insulated from the biological shield 5 by lagging 41. A wall 42 forming an extension of the biological shield 5 meets a gas tight floor 43 connected by a seal 44 to a containment sphere 45 and supported by a lattice girder structure 46.

Upper ducts 47 and lower ducts 48 allow convection flow of gas in a circuit over the core vessel 1 and over the walls of the sphere 45. Circulating fans 49 can be used to assist gas flow around the convection path shown by arrows 50.

The lattice girder structure 46 supports floors and storage chambers for miscellaneous apparatus connected with the operation of the reactor. The containment sphere 45 is welded to the skirt 36 and the pillar 37.

The invention has application in a sodium graphite nuclear reactor such as is disclosed in detail in a copending application Serial Number 744,185 in the names of Everett Long and Ronald Scott Challender.

I claim:
1. In a nuclear reactor installation having a reactor core supported in a sealed core vessel and having means for causing a heat transfer fluid to flow through the core to remove heat therefrom, a radiation shield defining with the core vessel fluid flow paths under said vessel and fluid flow paths along the side walls of said vessel, fluid flow channels penetrating said shield in upper and lower regions thereof, and a gas filled containment vessel for said radiation shield, core vessel and core defining voids between its inner surface and the shield for gas flow from said fluid flow channels in the upper regions of the shield to said fluid flow channels in the lower region of the shield, the containment vessel having its outer surface exposed to the free atmosphere.

2. A nuclear reactor installation as claimed in claim 1 wherein said radiation shield has a peripheral seal with the inner surface of the containment vessel to divide said containment vessel into upper and lower parts sealed from one another, the lower part containing the radiation shield, core vessel and core.

References Cited in the file of this patent
UNITED STATES PATENTS

| 2,790,760 | Powell | Apr. 30, 1957 |
| 2,810,689 | Wigner et al. | Oct. 22, 1957 |
| 2,811,487 | Stanton | Oct. 29, 1957 |
| 2,827,429 | Binner et al. | Mar. 18, 1958 |
| 2,841,545 | Zinn | July 1, 1958 |